United States Patent [19]

Pease et al.

[11] Patent Number: 4,948,138
[45] Date of Patent: Aug. 14, 1990

[54] DEVICE FOR MAINTAINING GAME STATE AUDIT TRAIL UPON INSTANTANEOUS POWER FAILURE

[75] Inventors: Logan L. Pease; William Wells, both of Reno, Nev.

[73] Assignee: IGT, Reno, Nev.

[21] Appl. No.: 789,356

[22] Filed: Oct. 21, 1985

Related U.S. Application Data

[63] Continuation of Ser. No. 447,358, Dec. 6, 1982, abandoned.

[51] Int. Cl.⁵ .......................... A63B 71/00; A63F 7/06
[52] U.S. Cl. .......................... 273/138 A; 273/DIG. 28; 273/1 E; 273/85 G
[58] Field of Search .................... 371/10, 14, 28, 66; 273/85 G, DIG. 28, 1 E, 138 A

[56] References Cited

U.S. PATENT DOCUMENTS

| | | | |
|---|---|---|---|
| 4,251,883 | 2/1981 | Grants et al. | 371/66 |
| 4,342,454 | 8/1982 | Baer et al. | 273/85 G |
| 4,412,284 | 10/1983 | Kerforne et al. | 371/66 |

FOREIGN PATENT DOCUMENTS 2831160 1/1980 Fed. Rep. of Germany ........ 371/66

Primary Examiner—Edward M. Coven
Assistant Examiner—Dean Small
Attorney, Agent, or Firm—Townsend and Townsend

[57] ABSTRACT

A look ahead state saving device for maintaining an audit trail of a plurality of discrete, sequential operating states in an electronic machine, such as a gaming machine. Each such state include accompanying operational data. A nonvolatile solid state memory maintains the audio trail. Game operation is initially interrupted and, thereafter, current state data is frozen in the memory when power source unreliability is detected and reliable machine operation cannot be maintained. The device retrieves the most recent game states and operational data from the memory upon restoration of power source reliability. Memory nonvolatility is maintained by a back-up battery source that includes a battery low detection circuit for interrupting machine operation in the event of battery failure, and that also includes a battery charging circuit.

5 Claims, 4 Drawing Sheets

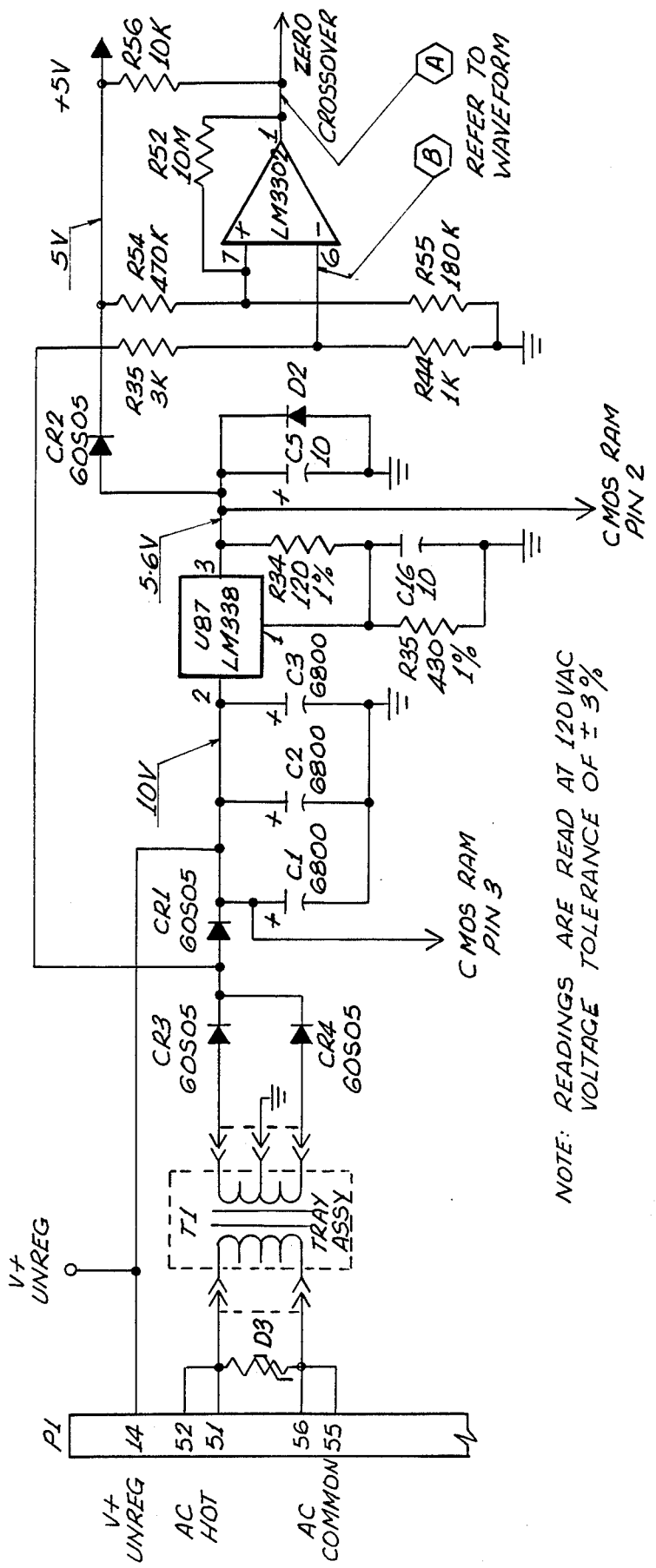
FIG 4
NOTE: READINGS ARE READ AT 120 VAC VOLTAGE TOLERANCE OF ± 3%
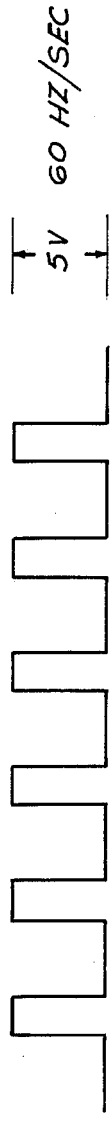
60 HZ/SEC

DEVICE FOR MAINTAINING GAME STATE AUDIT TRAIL UPON INSTANTANEOUS POWER FAILURE

This is a continuation of application Ser. No. 06/447,358, filed December 6, 1982, now abandoned.

BACKGROUND OF THE INVENTION

1. Field of the Invention

The present invention relates to electronic devices having a plurality of discrete sequential operating states. More particularly, the present invention relates to gaming or amusement devices including processor controlled circuitry, and wherein such gaming or amusement devices are subject to interruption during play, due to loss of power or lack of power source reliability.

2. Description of the Prior Art

Gaming and amusement devices are often placed in an abusive environment where they are subject to frequent and rapid power interruption. In the case of a gaming device, a player may be on his way to a win or may even be in the middle of a pay-out after a win when power interruption occurs. Such loss of power at this critical time may deprive the player of a winning play or of the balance of a jack-pot that has already been won. Additionally, power interruption may randomly shift the gaming or amusement device to an incorrect state such that free play or an unearned jack-pot is given to the player.

Gaming devices are strictly controlled by various governmental agencies. Most such agencies require that each gaming device maintain a record of game play. Thus, in addition to interfering with game operation, power failure or interruption might jeopardize the accuracy of the game record keeping component. For example, the game record keeping or audit device may indicate a win and a pay-out amount although a power interruption has prevented a full pay-out from occurring.

The traditional means of detecting a power shut down or interruption in such gaming and amusement devices has been the saving of various game pointers. In the more modern microprocessor controlled games, the pointers saved are program pointers. A problem with the program pointer saving approach is that it requires advance warning of the power failure in order to execute a pointer saver routine. Unfortunately, the environment in which such devices are used is often subject to instantaneous power loss. In such an event, there is no way for the device to institute its pointer saving routine. Thus, game play is interrupted in such a manner that it may not be resumed where it left off before such interruption.

Additionally, there are certain register values that are associated with each game play event. For example, the number of coins loaded into a machine determines the pay-out in the event of a win. A register maintains a count of the number of coins loaded. In the event of power failure, the pointer saving devices do not provide for maintaining register values. Thus, even if game play were restored, associated game values are lost. There is no mechanism provided in the art that allows such gaming and amusement devices to resume play at exactly the point of interruption in the game play sequence, nor is there a mechanism wherein game sequence register values are maintained intact during power source interruption.

SUMMARY OF THE INVENTION

The present invention solves the problems of saving sequential game states and associated register values in a gaming amusement device during a power shut-down or a loss of power source dependability. In this way, the present device assures reliability in the event of catastrophic power failure, by preserving critical game state and related data, such that game play may resume at the exact point at which it was interrupted by the power failure. In a gaming environment the present invention ensures that the confidence of the game player is maintained while the accuracy of game wins and payouts is strictly controlled. Thus, statistical integrity is maintained by the casino or amusement hall operator to monitor game dynamics and to satisfy the stringent requirements of game licensing authorities.

The present invention is a state saving device for an electronic machine such as a gaming or amusement device. The game is of a type that is microprocessor controlled and operates from a program in a plurality of discrete, sequential operating states. The present invention includes a nonvolatile solid state memory for maintaining an audit trail of the machine states and of state related data that may be present in game registers. Means are coupled to a game power source by which game operation is interrupted when the power source becomes unreliable. Means are also provided for resuming game operation upon resumption of power source reliability and at that point in game operation, as indicated by the state stored in the nonvolatile memory, where game play was interrupted.

In keeping with the object of providing absolute reliability to gaming and amusement devices, the present invention further provides a back-up memory power source, such as a battery, for maintaining state data stored in the nonvolatile solid state memory, during the interval of power interruption. Means are provided for detecting a battery low condition during normal game operation and for interrupting game operation in the event the back-up battery is unable to provide sufficient power for reliable memory operation. Additionally, a chargeable battery and battery charger may be included in the back-up battery circuit.

BRIEF DESCRIPTION OF THE FIGURES

FIG. 4 is a schematic diagram of a typical gaming or amusement device power supply.

DETAILED DESCRIPTION OF A PREFERRED EMBODIMENT

The present invention is a look-ahead state saving device for use in a processor controlled gaming or amusement device. The present invention provides reliable and instantaneous preservation of game states and associated register data in the event of game power interruption or loss of power source reliability.

Figure 1:
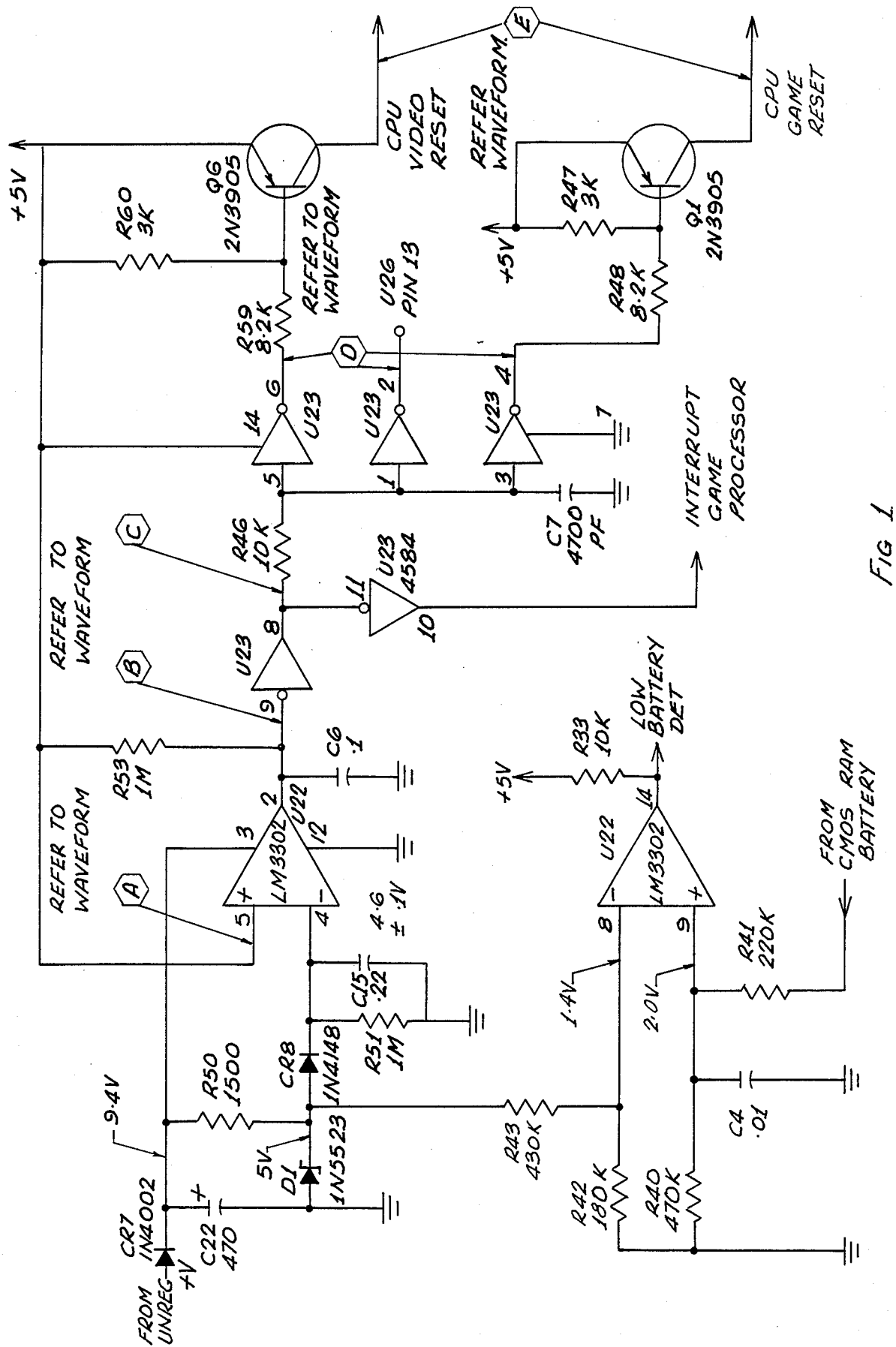
FIG. 1 is a schematic diagram of a portion of the present invention showing a power source interrupt detector.

FIG. 1 is a schematic diagram showing a power loss detect and game interrupt portion of the present invention. A regulated +5 volts source is provided from the gaming device power supply to the + input (pin 5) of a comparator U22-2. A typical power supply for such a gaming device is shown in FIG. 4. Referring back to FIG. 1, an unregulated positive voltage is provided through a rectifier CR7 to a reference voltage source including a filter capacitor C22, a resistor R50, and a zener diode D1. The reference voltage (in this instance 4.6 volts) is provided through a rectifier CR8 and a filter circuit R51/C15 to the − input (pin 4) of comparator U22-2.

Comparator U22-2 provides an output which is integrated by a capacitor C6. The voltage drop established across a resistor R53 and integrated by capacitor C6 is coupled to a first Schmitt trigger U23-8. The output of first Schmitt trigger U23-8 is coupled to a second Schmitt trigger U23-10, which in turn produces a game processor interrupt pulse, as discussed below.

The output of first Schmitt trigger U23-8 is additionally coupled to an integrator defined by a resistor R46 and a capacitor C7. The voltage integrated by capacitor C7 is used to drive additional Schmitt triggers U23-6, U23-2, and U23-4.

The output of Schmitt trigger U23-6 is coupled through a divider circuit R59/R60 to a transistor Q6 and thence to a game video reset circuit (not shown). The output of Schmitt trigger U23-4 is coupled through a voltage divider circuit R47/R48 to a transistor Q1 to provide a game CPU reset signal. Finally, the output of Schmitt trigger U23-2 is coupled to a buffer circuit at U26 pin 13 (not shown) to generate a reset signal, as shown in FIG. 2 at RESET-8.

The reference voltage source C22/R50/D1 also provides an output through a voltage divider circuit R43/R42 to a comparator U22-14, pin 8. A charge from a CMOS RAM battery is provided through a voltage divider R41/R40 and an integrating capacitor C4 to a comparator U22-14, pin 9. The output of comparator U22-14 is combined with a voltage drop across a resistor R43 to provide a low battery detect signal, as discussed below.

Figure 2:
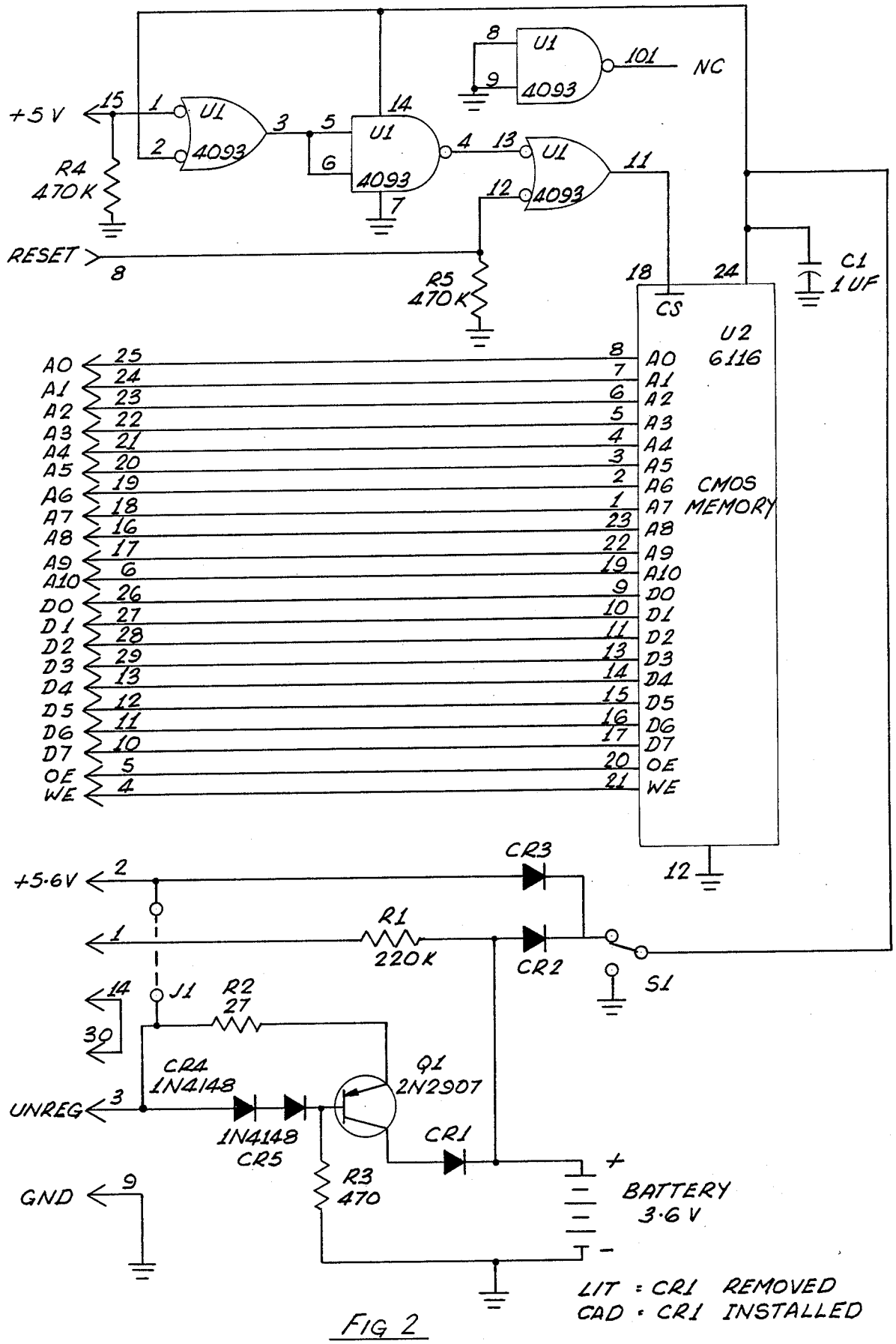
FIG. 2 is a schematic diagram of the portion of the present invention showing a nonvolatile solid state memory and back-up battery power source.

Referring now to FIG. 2, a CMOS memory U2 is shown, including connections to a game processor address bus A0–A10, the game processor data bus D0–D7, and the game processor read and write lines OE/WE.

The CMOS memory is provided with a regulated power source (shown as +5.6 volts at FIG. 2) through a rectifier CR3 and a switch S1 to memory U2, pin 24. A capacitor C1 is provided to filter power supply ripple. An additional back-up power supply is provided by the 3.6 volt battery and is supplied to memory U2 through a rectifier CR2 and switch S1. A battery sense voltage is developed across a resistor R1 and provided to the low battery detect circuit shown in FIG. 1.

The 3.6 volt battery may be either a rechargeable battery, such as a nickel cadmium battery or it may be a long life storage cell, such as a lithium battery. As indicated in FIG. 2, a rectifier CR1 is installed when a nickel cadmium battery is installed, but removed when a lithium battery is installed. Rectifier CR1 provides a trickle charge current, when in place and when a rechargeable battery is installed, to maintain the battery in a state of readiness. A charger circuit receives unregulated power at UNREG-3, which power is provided through a pair of rectifiers CR4/CR5 to the base of a transistor Q1 and through a resistor R2 to the emitter of transistor Q1. A charging current is provided through rectifier CR1 to the battery; a voltage drop across a resistor R3 determines the trickle charge voltage level.

CMOS memory U2 includes a chip select terminal CS at pin 18. A combinational logic function is provided by a dual Schmitt trigger U1-3 and U1-11. An inversion function is performed by a NAND gate U1-4. The keep alive battery voltage and/or the 5.6 volts CMOS cell operating voltage, as supplied through switch S1, are coupled to pin 2 of Schmitt trigger U1-3; the +5 volt power supply voltage is coupled to pin 1 of Schmitt trigger U1-3. A voltage drop is developed across a resistor R4. The output of Schmitt trigger U1-3 is coupled through pins 5 and 6 of gate U1-4 and inverted to provide an output which is coupled to pin 13 of Schmitt trigger U1-11; the reset signal is provided to pin 12 to Schmitt trigger U1-11, as developed across a resistor R5. The output of Schmitt trigger U1-11 is used to maintain a high condition at memory U2, pin 18 during a power down or reset condition to freeze the contents of the CMOS memory.

Figure 3:
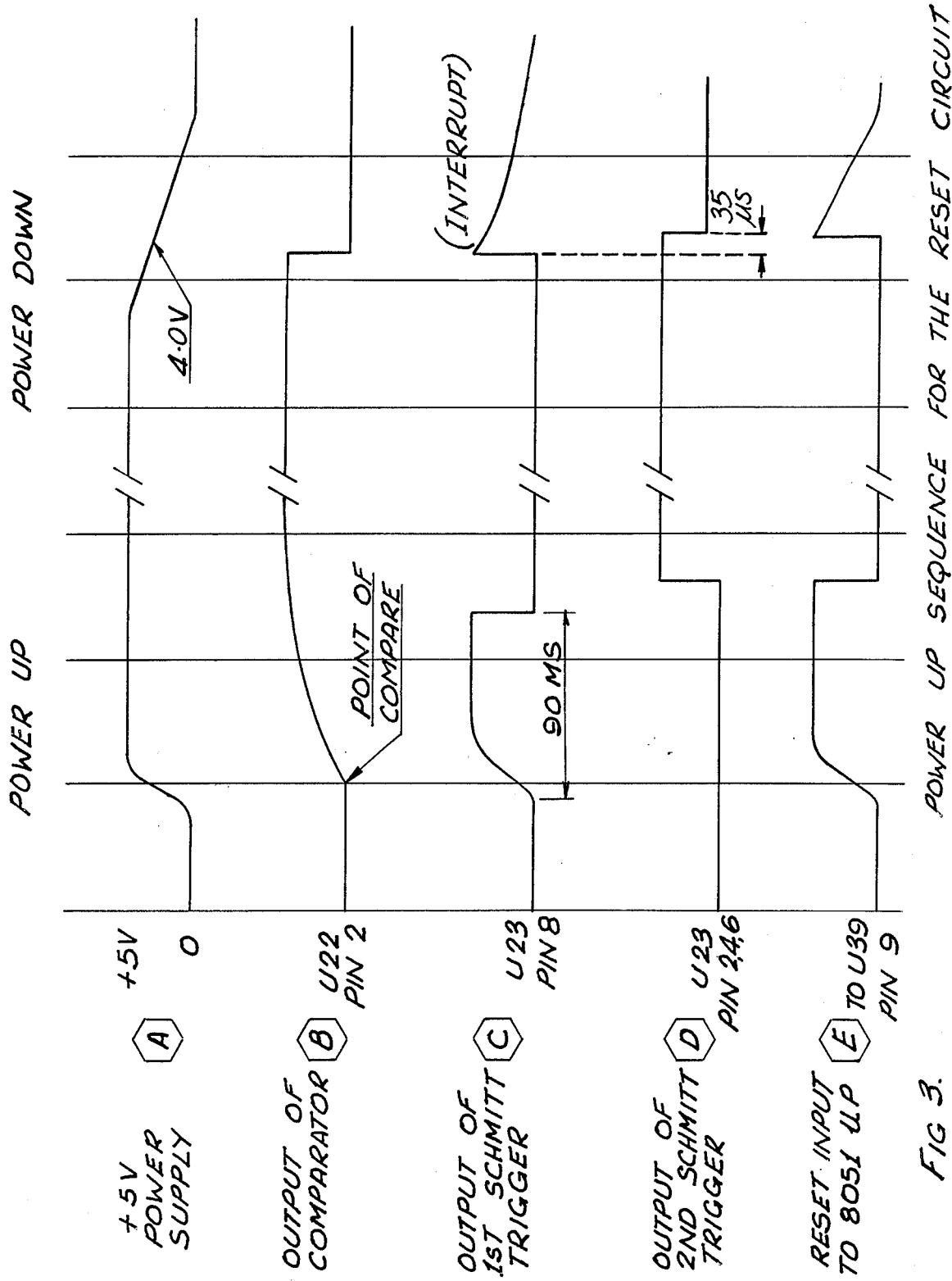
FIG. 3 is a timing diagram showing circuit operation during a power-up and power-down sequence.

Referring now to the schematic of FIG. 1 and the timing diagram of FIG. 3, the operation of the present invention is described. Electronic gaming and amusement devices, for example, video slot machines, operate under processor control according to a stored program. The present invention contemplates a gaming or amusement device wherein game operation is broken up into discrete, sequential states. That is, each game operation is a particular state in the game operation sequence. For example, in a video slot machine, the insertion of the coin into the slot might be state no. 1; pulling the slot machine handle might be state no. 2; spinning the reels might be state no. 3; etc. A gaming device may have as few or as many states as is necessary to allow for a game play sequence.

Gaming device operation is maintained by a power source (for example that shown in FIG. 4). When the game is first turned on there is a power-up sequence. FIG. 3 shows a timing diagram of the operation of the circuit in FIG. 1. The diagram in FIG. 3 begins with the absence of power in the game device at a first time. It can be seen that the +5 volt line at comparator U22-2, pin 5 (A) is at the zero volt level. At this time points B-E are also at the zero volt level.

As the machine power source is turned on and builds to an operating level, the +5 volt supply at comparator U22-2 pin 5 shown as increasing to the +5 volt or operating level. Comparator U22-2 pin 4 receives a 4.6 volt reference voltage. The reference voltage is produced from an unregulated +9.4 volt source by the reference generator circuit as discussed above.

As the +5 volt regulated power source rises above the 4.6 volt compare source level present at comparator U22-2 pin 4, a point of compare is reached at which time the comparator U22-2 begins producing an output voltage. The output from comparator U22-2 is a gradual slope as shown at B at FIG. 3.

The voltage produced at comparator U22-2 is provided to Schmitt trigger U23-8 pin 9, which has the property that it rapidly changes states when a threshold level is reached. The voltage applied to pin 9 of Schmitt trigger U22-8 is integrated at capacitor C6. Thus, when the threshold level is obtained as integrated on capacitor C6, Schmitt trigger U23-8 changes states. This is shown as C in FIG. 3. It should be noted that the Schmitt trigger is kept in a first state for approximately 90 milliseconds, at which time it rapidly changes states again. Whereas the rise time to change states at Schmitt trigger U23-8 is gradual, the falling edge of the pulse produced by Schmitt trigger U23-8 is nearly a vertical line. The falling edge of the output pulse produced by Schmitt trigger U23-8 is integrated by capacitor C7 to trigger Schmitt triggers U23-2/4/6, as shown at D on FIG. 3. Thus, the output of the three Schmitt triggers (U23-2/4/6) has a very steep rise time to a plateau level where it is maintained during normal machine operation.

Referring to E on FIG. 3, it can be seen that transistors Q1 and Q6 produce an output that gradually rises to a plateau level. This rise is a function of a voltage drop across resistors R47 and R60, respectively, as the +5 volt power supply rises to an operating level. After Schmitt trigger U23-4/6 changes states, a voltage drop across resistor voltage divider networks R59/R60 and R47/R48, respectively, change the state of transistors Q6 and Q1 to produce the power-up sequence CPU video reset and CPU game reset signals, which are routed to the various game processor operating circuits (not shown).

Schmitt trigger U23-2 produces a change of state signal as indicated at D at FIG. 3 that is routed to a device U26 pin 13 on a specific video gaming device (not shown). The signal thus produced is the reset signal shown in FIG. 2 at RESET-8. Resistor R5 produces a voltage drop for the reset signal such that a high is present at Schmitt trigger U1-11, pin 12. This produces a low signal at pin 18-C5 of CMOS memory U2, which unlocks or unfreezes the memory and at which point the game is operational.

During normal game operation the CMOS memory follows addresses and data on the address and data bus (A0-A10 and D0-D7) and maintains an audit trail of game states, register data, and game statistical history. Game states are stored such that, in the example of the video slot machine, if a coin is dropped into a coin slot, indicating state 1, and then a power failure occurs, the CMOS memory freezes at game state 1 until power is resumed. Upon resumption of game power, game play can continue at exactly the point where it left off before the power interruption. Read and write access to the CMOS memory is controlled by the write enable line WE.

The present invention also includes a provision whereby removing the CMOS memory circuit card from the timing device freezes the memory. The +5 volts at pin 15 in FIG. 2, coupled to pin 1 of Schmitt trigger U1-3 produces a high input signal during game operation, as developed across resistor R4. Removal of the CMOS memory card from the game removes the high condition from Schmitt trigger U1-3 which results in a high signal at memory U2-18 and which, in turn, freezes the CMOS memory.

In the event of power failure, as shown in FIG. 3 as the power-down portion of the timing diagram, the level of voltage supplied by the +5 volt power supply becomes lower than the 4.6 volt reference compare voltage present at comparator U22-2, pin 4. At this point the input to comparator U22-2 produces a downward ramping voltage. This downward ramping voltage in turn, produces a rapid falling edge change of state output from comparator U22-2. The falling edge output of comparator U22-2 triggers a rather rapid upward ramp or spike output from Schmitt trigger U23-8, which then has a gradual downward ramp. Approximately, 35 microseconds after Schmitt trigger U23-8 begins to change state, the output of Schmitt triggers U23-2/4/6 produce a steep falling edge change of state as shown at D in FIG. 3. The falling edge output of Schmitt triggers U23-4/6 result in a steep rising edge output from transistors Q1/Q6, respectively, which output gradually ramps downwardly.

As a result of this arrangement, the reset signal is removed from the CMOS memory, thereby freezing the present state data, associated register data, and game statistical data in the memory. Additionally, the transistor outputs abruptly interrupt any continuing game functions so that the game does not "coast" into other states.

The look-ahead feature of the present invention contemplates sending an interrupt to the game processor prior to freezing the game state memory. To this end Schmitt trigger U23-10 is set to respond to a change of state at the output of Schmitt trigger U23-8 as shown as the (INTERRUPT) in FIG. 3. The (INTERRUPT) signal is routed to the game processor circuit (not shown) prior to freezing the state data in CMOS memory, and prior to shutting down the associated game processor circuitry. The interrupt signal tells the game processor that, "power is on the way down, stop doing what you are doing." Thus, the game processor is able to look ahead to see a condition of power source unreliability coming up and thereby suspend any further processing until power is restored.

During normal operation, the CMOS memory is maintained in an active state by power from the power source as indicated in FIG. 2 as +5 volts and as provided through CR3 and S1. In the event of power failure, power from the 3.6 volt keep alive battery is provided through rectifier CR2 and switch S1 to memory U2, pin 24. When switch S1 is set to its ground position, all power is removed from memory U2, pin 24 and the contents of the MOS memory are effectively purged. Generally, a game operator will not want to purge the contents of the CMOS memory as it will usually contain a statistical or historical record of game operation, such as jack-pots, amounts paid out, coins played. If the game is being "recommissioned" or if a new CMOS memory is being installed in the game, it is desirable to begin game operation with a clean slate. Hence, the clear memory feature.

The back-up battery may either be of the lithium or other such storage type (alkaline, etc.) or it may be of the rechargeable type, such as a nickel cadmium battery. Rectifier CR1 is included in the circuit when a rechargeable battery is used and provides a trickle charge, as developed from the unregulated power source by transistor Q1, and at a level determined by resistor R3. Rectifier CR1 prevents the battery from draining through the transistor in the event of power loss.

During normal game operation, a flow of current from the battery is provided through resistor R1 to the low battery detector circuit shown in FIG. 1. The CMOS memory battery current is provided through resistor R41 in FIG. 1 to pin 9 of comparator U22-14. A 1.4 volt compare level is set at pin 8 of comparator U22-14 such that, if the battery level drops below that necessary to maintain reliable memory operation in the event of power failure, then the low battery detect signal is produced, which signal interrupts game operation. The game stops operating in the event that the back-up battery is unable to maintain the memory in an active condition during a power failure.

Removing the CMOS memory from the game does not disturb the memory contents, but only serves to freeze the contents therein. Should the game require servicing, it is possible to maintain game statistical and state data intact until the game is repaired. Additionally, should an audit of games be required, it is possible to remove the CMOS memory from a machine and read the contents at a remote location. This simplifies the audit process.

FIG. 4 shows a typical power supply that may be used in conjunction with a gaming device of the type for which the present invention is intended. The power supply includes a full wave rectifier CR3 and CR4 connected to transformer T1 and producing a DC output that is filtered by capacitor C1-C3 and regulated by IC regulator U87.

It will be appreciated that the present invention has applications in many devices other than gaming or amusement devices. For example, any processor controlled device wherein device operation is a function of discrete, sequential processor states and which is subject to catastrophic power failure would benefit from the inclusion of the present invention. It should be appreciated that although various voltage levels were described in the exemplary embodiment discussed above, it is possible to produce the present invention for operation at other voltage levels. Furthermore, the waveforms displayed in FIG. 3 are for purposes of example. Other wave relations may be established, depending upon desired results in a particular processor controlled environment. While the memory incorporated into the present invention has been characterized as a CMOS device, it will further be appreciated that other types of solid state memories may be substituted therefor, e.g. NMOS, magnetic bubble. Therefore, the scope of the invention should be limited only by the breadth of the claims.

We claim:

1. A look-ahead state saving device for processor controlled interactive electronic game played by a game player, operated from a game power source, and having an operating cycle including a plurality of discrete sequential interactive game states accompanied by interactive game state dependent data, comprising:

a nonvolatile solid state memory for providing a continually updated audit trail of interactive game states and accompanying interactive game state related data characterizing the interaction of a game player and the game for a particular interactive game state;

means for continually producing a reset signal for resetting said memory;

comparator means for detecting a game power source level less than that of a game operating reference level;

means for producing a game interrupt signal wherein game operation is interrupted at a current interactive game state in response to comparator detection of a game power source level less than the game operating reference level;

means for producing a memory freeze signal to prevent memory reset, said signal being produced a preselected time interval after production of said game interrupt signal in response to comparative detection of said game power source level less than the game operating reference level, wherein said interactive game state and accompanying interactive state related data are retained in said memory after completion of a current game state whereby said retained interactive game state and interactive state related data provide for error free resumption of game play.

2. The state saving device of claim 1, further comprising:

means for clearing said memory.

3. The state saving device of claim 1, further comprising:

a back-up battery source for maintaining data in said memory in the event of power interruption.

4. The state saving device of claim 3 further comprising:

means for detecting a battery condition and for producing said game interrupt and memory freeze signals upon detection of said battery low condition.

5. In a processor controlled interactive electronic game played by a game player having an operating cycle including a plurality of sequential interactive game states, and wherein each game state includes accompanying interactive game state dependent data, a method for saving interactive game operating states and interactive game state related data during game power source interruption, comprising the steps of:

maintaining a continually updated audit trail of the most recent interactive state and its accompanying interactive game state related data characterizing the interaction of a game player and the game for a particular game state in a continually reset nonvolatile solid state memory;

interrupting game operation after completion of a current interactive game state when a power source coupled to said game is unable to maintain reliable game operation;

freezing said current interactive game state and interactive game state dependent data in said memory to prevent memory reset, said freezing occurring a selected time interval after interruption of game operation; and retrieving said current interactive game state and its accompanying interactive game state related data from said memory to resume game operation at its last interactive state before power source interruption, upon resumption of power source reliability.

* * * * *